United States Patent [19]

Wallerstein et al.

[11] Patent Number: 4,747,895
[45] Date of Patent: May 31, 1988

[54] CONTINUOUS ULTRASONIC PERFORATING SYSTEM AND METHOD

[75] Inventors: Lawrence B. Wallerstein; Youn Mobasser, both of New Rochelle, N.Y.

[73] Assignee: American White Cross Laboratories, Inc., New Rochelle, N.Y.

[21] Appl. No.: 898,210

[22] Filed: Aug. 20, 1986

[51] Int. Cl.$^4$ .............................................. B32B 31/18
[52] U.S. Cl. ....................................... 156/73.3; 83/30; 83/660; 156/252; 156/253; 156/494; 156/580.2; 264/23; 264/156
[58] Field of Search ...................... 156/73.1, 73.3, 252, 156/253, 580.1, 580.2, 494; 264/23, 156; 83/30, 660

[56] References Cited

U.S. PATENT DOCUMENTS

| | | | |
|---|---|---|---|
| 3,566,726 | 3/1971 | Politis | 264/156 |
| 3,655,491 | 4/1972 | Dyke | 156/253 |
| 3,756,880 | 9/1973 | Graczyk | 156/73.3 |
| 3,844,869 | 10/1974 | Rust, Jr. | 156/73.1 |
| 4,426,242 | 1/1984 | Sarkans et al. | 156/252 |

Primary Examiner—Michael Wityshyn
Attorney, Agent, or Firm—Auslander & Thomas

[57] ABSTRACT

The invention is for a system and method of ultrasonically perforating a continuously moving strip of material in a matrix pattern. The system comprises a knurled rotating drum having sharp, perforating projections over which the strip to be perforated is caused to pass. A sonic horn positioned over the strip forces the strip into perforating contact with the drum, rapidly.

12 Claims, 2 Drawing Sheets

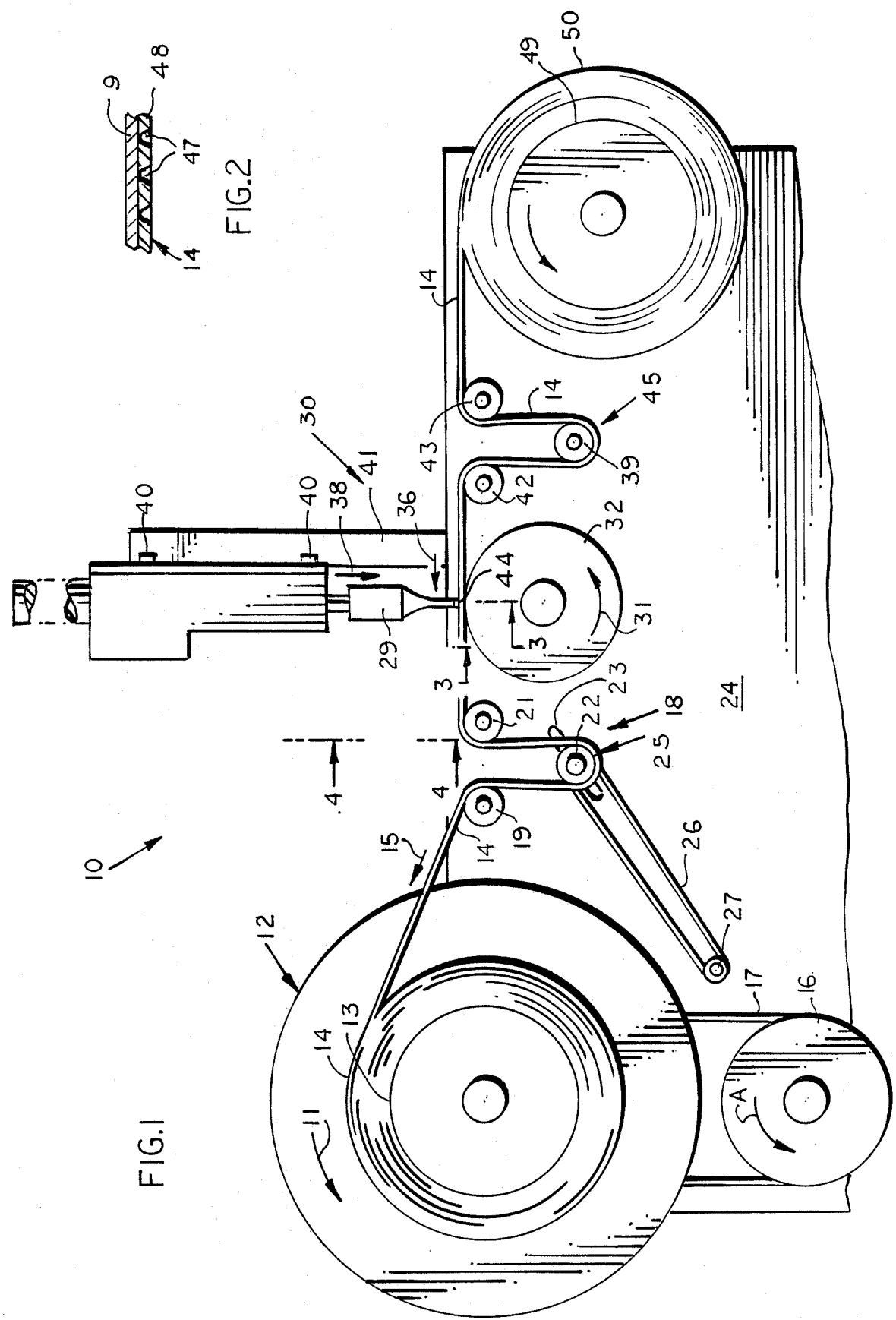

CONTINUOUS ULTRASONIC PERFORATING SYSTEM AND METHOD

FIELD OF THE INVENTION

The invention relates to an ultrasonic system and method for providing a matrix pattern of perforations in a strip of material, and more particularly, to a system and method of continuously perforating a strip of material moving very fast.

BACKGROUND OF THE INVENTION

It has been known that ultrasonic perforations of cured thermo set plastics tends to cause fracturing of the material. As a result, a prior perforating system described in U.S. Pat. No. 4,160,055 issued July 3, 1979 suggests that the perforations be accomplished in an uncured plastic material. The object of perforating uncured plastic is to prevent fracture by the utilization of softer, more pliable materials, which allow penetrating pins to easily perforate the material.

One of the drawbacks of the aforementioned system is its low throughput. By reason of using soft materials in the perforating process, such a system cannot process the material in a high speed continuous manner.

A continuous and high speed apparatus and method of perforating a strip of material is shown in U.S. Pat. No. 4,472,461 issued Sept. 18, 1984. Such a system perforates the material by moving the strip past a fixed gas ejecting cylinder or tube. The tube contains discrete, spaced-apart, gas emitting apertures that puncture holes in the uncured, adhesively coated material, as the material is caused to move past the tube.

While this system can accomplish a perforation of the strip, its perforating throughput is limited to approximately 50 feet of material per minute, or less.

The subject invention has discovered that a strip of material, such as cured plasticized thin film, can be continuously perforated by an ultrasonic horn without fracturing the plastic, and with an increased throughput of approximately up to 220 feet per minute. The system and method of the invention accomplishes the above result with solid, or cured plastic material. The strip of material is momentarily engaged between a knurled, rotating roller, and an ultrasonic horn as the material is caused to move past at the high linear speed of approximately 200 feet per minute. The ultrasonic horn disposed adjacent the rotating knurled roller, on the opposite side of the web of strip material, forces a rapid and momentary perforating contact between the strip and perforating projections of the knurled surface. The material maintains its structural integrity while being perforated at the perforating projections of the knurled roller.

A roll of plastic film, with a pressure sensitive adhesive coating on one side and said pressure sensitive coating covered by a coated release paper, was mounted onto a rotatable unwind shaft. The film web (with adhesive and protective covering) was led through a web-tensioning device to provide constant web tension throughout the ensuing operation. The web was passed through a perforating device and then rewound.

The perforating device is composed of a patterned roll and a platen surface.

The patterned roll may have a knurled surface or a spiked surface, each providing a multitude of contact points which produce an overall pattern of perforation. These surfaces may be prepared by knurling or by engraving.

To increase the useful life of the roll surface, hardening is recommended. Best hardness of the spike points was achieved by use of the E.D.M. method of engraving. The spikes can be shaped as pyramids or round spires. They may be pointed or slightly truncated.

The platen surface is a flat, hardened, carbide facing on the edge of a specially shaped steel plate. This combined part is referred to as the "horn." The horn is mounted in a vertical position and is attached to an amplifier.

When ultrasonic energy is applied to the amplifier, the horn vibrates internally with very small amplitude at very high frequencies. The horn and amplifier are mounted in a vertically traversing mechanism that permits precise positioning relative to the surface of the patterned roll.

However, the preferred procedure was to have the film on the downside, i.e., making first contact with the spires of the patterned, surface. The different registration of the horn may obtain different forms of perforations. A good result is obtained with the platen on the horn touching the paper. In such instance, the paper remained unbroken while the proper opening was formed in the plastic from the knurled roller whose spikes may be slightly truncated.

The strip is perforated on this mechanism and satisfactory, permanent "breathing" holes are formed in the laminate regardless of which side of the web is in contact with the perforating machine.

A hard roll (Rockwell C55-62) is preferred. The platen surface was positioned so that no contact is made with the spires when at full vibrating amplitude. In this position, the spires fully penetrate the plastic film and the adhesive layer while only touching or partially penetrating the paper adhesive protector sheet. The paper sheet is discarded during subsequent operation.

A variable drive for the patterned roll permits speed changes in the web as various power-speed combinations are tested.

At maximum energy input from available ultrasonic source, the speed of the laminated plastic strip, up to approximately 220 linear ft/min produces satisfactory results when using a plastic web width of approximately three inches. Since a finite amount of ultrasonic energy is utilized over an area per unit of time; i.e., width-×length=constant, a narrower web width would be processable at a faster linear speed and a wider web at a slower rate. It is also assumed that the energy required to produce perforations would be proportioned to the thickness of the web to achieve the same rate of production.

DISCUSSION OF RELATED ART

It is well known that when a solid film of plastic is passed through a set of piercing points such as needles or a knurled surface, small pierced holes are formed, temporarily. Upon removal of the piercing points the hole tends to close up, approaching its original surface conformation rendering the film almost impervious.

Others have attempted to prevent the closure of the openings by heating the points of the piercing instrument. This method has achieved the desired result, but at a very slow productive rate of speed. Reference U.S. Pat. No. 3,073,304 dated Jan. 15, 1963. Higher degrees of heat increase the rate slightly. With increased temperature, deleterious chemical and physical changes occur in the plastic film and in the adhesive layer. Another conventional method is punching a multitude of small diameter holes in the film. This weakens the film and creates a disposal problem of the punched out pieces. Also, it must be synchronized with the production of the subsequent product in such a way as to centrally register the perforation pattern within the product perimeter.

A perforating roll, with an engraved or knurled surface, providing a multitude of small spikes or pyramids, was provided. A stationary platen was mounted adjacent to and tangential to the perforating roll surface.

A web consisting of a thin film of plastic (plasticized PVC), a pressure sensitive adhesive coating on one side, and a protective release sheet of paper covering the exposed adhesive surface was passed between the piercing surface and platen with no permanent perforations remaining.

However, when the ultrasonic horn was vibrated at V.H.F. in a radial plane to the piercing roll, permanent openings were found to have formed in the web passing through.

Ultrasonic energy was applied to the ultrasonic horn to produce a very high frequency, small amplitude, vibration in the desired relationship to the roll. Each point on the surface produced an opening in the web conforming to the shape of the point. The vinyl formed a ridge, or crater, with the adhesive pushed to the edge of the opening.

After passing through the apparatus, the deformation, thus formed, remained stable. The film strength was not diminished due to the reinforcing ridge around each tiny opening.

As the amount of ultrasonic energy was increased, speed of web travel through the apparatus was able to increase almost proportionally.

In U.S. Pat. No. 4,311,540, issued Jan. 19, 1982, a process for ultrasonically bonding web fibers, is illustrated. The process comprises a web of material having a loose batt of fibers that are caused to be welded together, thus producing a fabric. The system of the method features an ultrasonic horn spaced appositely from a rotating roller. The roller has a number of smooth projections arranged in a matrix pattern. The batt is caused to be passed between the horn and the roller, whereby the fibers contiguous of the smooth projections on the roller surface, are caused to be heated into welding contact by the ultrasonic horn.

BRIEF DESCRIPTION OF THE DRAWINGS

Although such novel feature or features believed to be characteristic of the invention are pointed out in the claims, the invention and the manner in which it may be carried out, may be further understood by reference to the description following and the accompanying drawing.

FIG. 1 illustrates a frontal schematic view of the system of the invention;

FIG. 2 is a sectional view of the perforated strip of material;

DETAILED DESCRIPTION OF THE INVENTION

Figure 4:
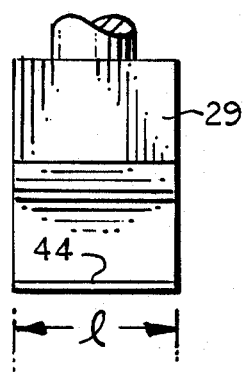
FIG. 4 is a side view of the ultrasonic horn of the inventive system as viewed along lines 4—4 of FIG. 1.

Referring now to the figures in greater deail, where like reference numbers denote like parts in the various figures.

Generally speaking, the invention features a continuous system and method for ultrasonically forming a pattern of perforations in a strip of material, such as plastic. The material is continuously moved past an ultrasonic horn which forces the material against a rotating roller having a knurled surface of sharp projections. The projections melt holes between an ultrasonic horn and the knurled roller in the material strip, and a matrix of perforations is formed on a continuous basis.

Now referring FIG. 1, the perforating system 10 of this invention is shown in a schematic frontal view. The system 10 comprises a rotatable (arrow 11) storage roller 12 having a drum 13 upon which a quantity of strip material 14 is wound. The strip material 14 is caused to be wound into a processing feed path (arrow 15) from the storage roller 50, by means of a driver 16, which is driven with a belt 17 in the direction of arrow A.

The strip material 14, including a plastic web 48 and a backing paper 9, as shown in FIG. 2, leaves the drum 49 and storage roller 50. It is caused to be fed to a tensioning device consisting of three pulleys 39, 42 and 43, respectively. Pulleys 39, 42 and 43 are rotatably fixed. The storage roller 12 has a tensioning device 18, including pulleys 19 and 21, with a floating center roller 22, which is free to move within slot 23, formed in vertical wall 24. Floating pulley 20 comprises a contact surface 25 over which the strip 14 rides, and directly behind it, a surface over which one end of an elastic tension belt 26 rides. The elastic tension belt is rotatively anchored at its other end upon rotatable pulley 27.

Depending upon the driving speed of drive roller 16, the elastic tension belt 26 will cause the floating pulley 22 to maintain a proper tension on strip 14, as the pulley 22 translates tension within the slot 23.

The continuously moving strip 14 is fed over the fixed pulley 43, around the fixed pulley 39 and then over the fixed pulley 42.

From pulley 42, strip 14 is fed to a perforating station 30.

The perforating station 30 includes a sonic horn 29 (also shown in FIG. 4) having a length "l" equal to the width "d" (FIG. 3), of the adjacent rotating (arrow 31) drum 32.

The sonic horn 29 is manufactured by Branson Sonic Power Company of Danbury, Conn.

Figure 3:
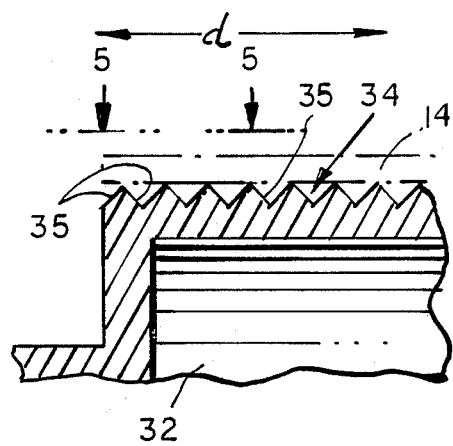
FIG. 3 is a sectional view of the knurled surface of perforating rollers of the system of the invention as viewed along lines 3—3 of FIG. 1.

The rotating drum 32 has a knurled surface 34, as illustrated in FIG. 3. The knurled surface 34 contains a matrix of sharp, perforations 35, as shown.

When the strip 14 is caused to be passed (arrow 36) over drum 32, the sonic horn 29 with its platen 44 is preferably brought into just contiguous contact with the strip 14, wherein the strip 14 is forced between the projections 35, causing the strip to become perforated by drum 32.

The sonic horn 29 is lowered (arrow 38) into contact with strip 14 by means of attached guide rail projections 40 and guide rail 41, over which the projections 40 vertically slide.

The position of the horn at selected distances may produce different types of perforations. Preferably, there is no impact between the projections 35 and the platen 44. The carbide surface of the platen 44 gets abraded when this happens and the knurlings 35 tend to get flattened.

After perforating, the strip 14 is passed over the set of rollers 18. The strip 14 is then passed onto the storage roller 12 moving in the direction of arrow 11 and then onto the drum 13.

All the drums, rollers and pulleys are mounted for rotation on wall 24, which is part of the machine frame.

Figure 5:
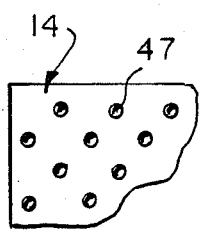
FIG. 5 is a top view of the perforated strip of material shown in FIG. 2, and as viewed along lines 5—5 of FIG. 3.

Referring to FIGS. 2 and 5, the perforations 47 caused to be formed in strip 14 are shown, respectively, in a sectional and plan view.

The speed at which the strip can be fed through the system is between approximately up to 220 feet per minute.

The sonic horn operates in a frequency range of about 20 KHz.

The plastic used in the system is preferably PVC, but can also be polyethylene, or polypropylene.

The terms and expressions which are employed are used as terms of description; it is recognized, though, that various modifications are possible.

It is also understood the following claims are intended to cover all of the generic and specific features of the invention herein described, and all statements of the scope of the invention, which as a matter of language, might fall therebetween.

Having described certain forms of the invention in some detail, what is claimed is:

1. A continuous system for rapidly ultrasonically perforating a continuous adhesive backed plastic strip to provide a breathable matrix pattern of holes therein, said continuous adhesive backed strip being mounted on a continuous strip of release material, said system including means defining a feed path for the transport of said mounted continuous adhesive backed plastic strip; a first station disposed in said feed path; said feed path starting at a source of said mounted continuous adhesive backed plastic strip; said first station comprising tensioning means adapted to provide tension to said mounted continuous adhesive backed plastic strip as it is fed in said feed path; a second station disposed in said feed path; said second station comprising ultrasonic perforating means including a knurled roller; said knurled roller being rotatively adjacent said mounted continuous adhesive backed plastic strip and disposed on one side thereof; an ultrasonic horn adjacent said knurled roller disposed on an opposite side of said mounted continuous adhesive backed plastic strip; said knurled roller and said ultrasonic horn adapted to cause a matrix pattern of holes to be continuously formed; a third station disposed in said feed path; said third station comprising tensioning means adapted to provide tension to said mounted continuous adhesive backed plastic strip as it is fed in said feed path; said third station tensioning means including a floatable pulley; and at least means defining a feed path for the transport of said continuous adhesive backed plastic strip from said third station.

2. The continuous system of claim 1, including a driven roll, a storage roll, said driven roll being disposed in said feed path beyond said third station, said driven roll being rotatively driven in synchronization with said storage roll, wherein said mounted continuous adhesive backed plastic strip is caused to move between said rolls along said feed path at a driven speed in a range of approximately between at least 180 to 220 feet per minute.

3. The continuous system of claim 1, wherein said strip of release material comprises a peel-off backing.

4. The continuous system of claim 1, wherein said third station floatable pulley includes means defining a slot adjacent said floatable pulley, means for movably affixing said floatable pulley for slidable movement in said slot, and a flexible tensioning belt which is anchored on one end and movably affixed to said floatable pulley on another end, whereby said tensioning belt causes said floatable pulley to eliminate slack in said mounted continuous adhesive backed plastic strip.

5. The continuous system of claim 1 wherein the outer portion of said continuous adhesive backed plastic strip directly faces said knurled roller.

6. The continuous system of claim 1 wherein plastic strip is selected from a group consisting of polyvinyl chloride, polyethylene or polypropylene.

7. A method of for rapidly ultrasonically perforating a continuous adhesive backed plastic strip to provide a breathable matrix pattern of holes therein, comprising the steps of mounting said continuous adhesive backed plastic strip on a continuous strip of release material, feeding said mounted continuous adhesive backed plastic strip in a feed path to a first station, said first station being disposed in said feed path, said feed path starting at a source of said mounted continuous adhesive backed plastic strip, providing said first station with tensioning means adapted to tension said mounted continuous adhesive backed plastic strip, feeding said mounted continuous adhesive backed plastic strip in said feed path to a second station, providing said second station with ultrasonic perforating means, said ultrasonic perforating means including a knurled roller, said knurled roller being rotatively adjacent said mounted continuous adhesive backed plastic strip and disposed on one side thereof, providing an ultrasonic horn adjacent said knurled roller disposed on an opposite side of said mounted continuous adhesive backed plastic strip, said knurled roller and said ultrasonic horn adapted to perforate said mounted continuous adhesive backed plastic strip, perforating said mounted continuous adhesive backed plastic strip causing a matrix pattern of holes to be continuously formed at said second station, feeding said perforated mounted continuous adhesive backed plastic strip to a third station disposed in said feed path, providing said third station with tensioning means adapted to provide tension to said mounted continuous adhesive backed plastic strip as it is fed along said feed path, said third station tensioning means including a floatable pulley, and providing at least a feed path for the transport of said continuous adhesive backed plastic strip from said third station.

8. The method of claim 7, including the step of providing a driven roll, providing a storage roll, said driven roll being disposed beyond said third station, driving said driven roll rotatively in synchronization with said storage roll, wherein said mounted continuous adhesive backed plastic strip is caused to move between said rolls along said feed path at a driven speed in a range of approximately between at least 180 to 220 feet per minute.

9. The continuous system of claim 7, including the step of stripping said release material.

10. The method of claim 7, including the steps of providing said third station floatable pulley with a slot adjacent said floatable pulley, providing means for movably affixing said floatable pulley for slidable movement in said slot, providing a flexible tensioning belt, and anchoring one end of said tensioning belt and movably affixing the other end to said floatable pulley, whereby said tensioning belt causes said floatable pulley to eliminate slack in said mounted continuous adhesive backed plastic strip.

11. The method of claim 7, wherein the outer portion of said mounted continuous adhesive backed plastic strip directly faces said knurled roller.

12. The method of claim 7 wherein said plastic of said continuous adhesive backed plastic strip is selected from a group consisting of polyvinyl chloride, polyethylene or polypropylene.

* * * * *